US008401341B2

(12) United States Patent
Miyamoto (10) Patent No.: US 8,401,341 B2
(45) Date of Patent: Mar. 19, 2013

(54) IMAGE PROCESSING APPARATUS, METHOD, AND STORAGE MEDIUM FOR GENERATING A MAGNIFIED IMAGE BY SYNTHESIZING STRUCTURE AND TEXTURE

(75) Inventor: Naotomo Miyamoto, Tokyo (JP)

(73) Assignee: Casio Computer Co., Ltd., Tokyo (JP)

( * ) Notice: Subject to any disclaimer, the term of this patent is extended or adjusted under 35 U.S.C. 154(b) by 310 days.

(21) Appl. No.: 12/892,979

(22) Filed: Sep. 29, 2010

(65) Prior Publication Data

US 2011/0075947 A1      Mar. 31, 2011

(30) Foreign Application Priority Data

Sep. 30, 2009   (JP) ................................ 2009-225732

(51) Int. Cl.
*G06K 9/32* (2006.01)
(52) U.S. Cl. ........................ 382/299; 345/698
(58) Field of Classification Search .................. None
See application file for complete search history.

(56) References Cited

U.S. PATENT DOCUMENTS

| 2005/0083350 | A1* | 4/2005 | Battles | 345/660 |
| 2006/0227153 | A1* | 10/2006 | Anwar et al. | 345/660 |
| 2010/0074549 | A1* | 3/2010 | Zhang et al. | 382/263 |

FOREIGN PATENT DOCUMENTS

| JP | 2003-125197 A | 4/2003 |
| JP | 2003-348377 A | 12/2003 |
| JP | 2007-317109 A | 12/2007 |
| JP | 2008-054267 A | 3/2008 |

OTHER PUBLICATIONS

Darwish et al., "Adaptive resampling algorithm for image zooming," IEE Proc.-Vis. Image Signal Process, vol. 144, No. 4, Aug. 1997.*
Sakuta et al., "Super-Resolution utilizing Total Variation Regularization on CELL Processor," 2012 IEEE International Conference on Consumer Electronics.*
Chinese Office Action dated Jun. 5, 2012 (and English translation thereof) in counterpart Chinese Application No. 201010540067.6.

* cited by examiner

*Primary Examiner* — Bhavesh Mehta
*Assistant Examiner* — Andrew Moyer
(74) *Attorney, Agent, or Firm* — Holtz, Holtz, Goodman & Chick, P.C.

(57) ABSTRACT

An imaging apparatus has an intermediate image generating section to generate a second structure component and a second texture component by magnifying each of a first structure component and a first texture component separated from an original image by an intermediate magnification ratio. The second structure component and the second texture component are synthesized to generate an intermediately magnified image. A final image generating section generates a finally magnified image by synthesizing a finally magnified structure component generated by magnifying a third structure component separated from the intermediately magnified image by a final magnification ratio, and a finally magnified texture component generated by magnifying the first texture component by the final magnification ratio.

5 Claims, 5 Drawing Sheets

IMAGE PROCESSING APPARATUS, METHOD, AND STORAGE MEDIUM FOR GENERATING A MAGNIFIED IMAGE BY SYNTHESIZING STRUCTURE AND TEXTURE

BACKGROUND OF THE INVENTION

1. Field of the Invention

The present invention relates to an image processing apparatus, an image processing method using the image processing apparatus, and a storage medium.

2. Description of the Related Art

An image processing apparatus to change a magnified image to a high definition image by using a Total Variation (TV) Method in image magnifying processing in place of interpolation methods, such as a nearest neighbor method and a bicubic method, has conventionally been known (e.g. Japanese Patent Application Laid-Open Publication No. 2007-317109).

The aforesaid magnification method using the TV method can achieve a change of a magnified image to a high definition image better than the interpolation methods, such as the nearest neighbor method and the bicubic method. If a magnification ratio becomes larger in the magnification method, however, an image edge becomes dim, or the noise quantity of a magnified image increases. As a result, the magnification method has a problem in which the fine feeling of a magnified image fades.

BRIEF SUMMARY OF THE INVENTION

Accordingly, it is an object of the present invention to provide an image processing apparatus, an image processing method, and a storage medium that can properly achieve a change of a magnified image to a high definition image.

According to a first aspect of the present invention, there is provided an image processing apparatus, including: an obtainment section to obtain an original image; a designation section to designate a final magnification ratio of the original image obtained by the obtainment section; a first separation section to separate a first structure component and a first texture component from the original image obtained by the obtainment section; an intermediate image generating section to generate a second structure component and a second texture component by magnifying each of the first structure component and the first texture component of the original image by an intermediate magnification ratio smaller than the final magnification ratio, and to synthesize the second structure component and the second texture component to generate an intermediately magnified image; a second separation section to separate a third structure component from the intermediately magnified image generated by the intermediate image generating section; a structure magnifying section to magnify the third structure component to generate a finally magnified structure component which has the final magnification ratio to the original image in size; a texture magnifying section to magnify the first texture component to generate a finally magnified texture component which has the final magnification ratio to the original image in size; and a final image generating section to synthesize the finally magnified structure component and the finally magnified texture component to generate a finally magnified image.

According to a second aspect of the present invention, there is provided An image processing method using an image processing apparatus, including the steps of: obtaining an original image; designating a final magnification ratio of the obtained original image; separating a first structure component and a first texture component from the obtained original image; generating a second structure component and a second texture component by magnifying each of the first structure component and the first texture component of the original image by an intermediate magnification ratio smaller than the final magnification ratio, and synthesizing the second structure component and the second texture component to generate an intermediately magnified image; separating a third structure component from the generated intermediately magnified image; magnifying the third structure component of the intermediately magnified image by the final magnification ratio to generate a finally magnified structure component which has the final magnification ratio to the original image in size; magnifying the first texture component of the original image by the final magnification ratio to generate a finally magnified texture component which has the final magnification ratio to the original image in size; and synthesizing the generated finally magnified structure component and the generated finally magnified texture component to generate a finally magnified image.

According to a third aspect of the present invention, there is provide a storage medium storing a program enabling a computer of an image processing apparatus to function as: an obtainment section to obtain an original image; a designation section to designate a final magnification ratio of the original image obtained by the obtainment section; a first separation section to separate a first structure component and a first texture component from the original image obtained by the obtainment section; an intermediate image generating section to generate a second structure component and a second texture component by magnifying each of the first structure component and the first texture component of the original image by an intermediate magnification ratio smaller than the final magnification ratio, and to synthesize the second structure component and the second texture component to generate an intermediately magnified image; a second separation section to separate a third structure component from the intermediately magnified image generated by the intermediate image generating section; a structure magnifying section to magnify the third structure component to generate a finally magnified structure component which has the final magnification ratio to the original image in size; a texture magnifying section to magnify the first texture component to generate a finally magnified texture component which has the final magnification ratio to the original image in size; and a final image generating section to synthesize the finally magnified structure component and the finally magnified texture component to generate a finally magnified image.

According to the first, second and third aspects of the present invention, it is possible to emphasize an image edge to properly achieve a change of a magnified image to a high definition image.

DETAILED DESCRIPTION OF THE INVENTION

In the following, a concrete embodiment of the present invention will be described with reference to the accompanying drawings. The scope of the invention is, however, not limited to the shown examples.

Figure 1:
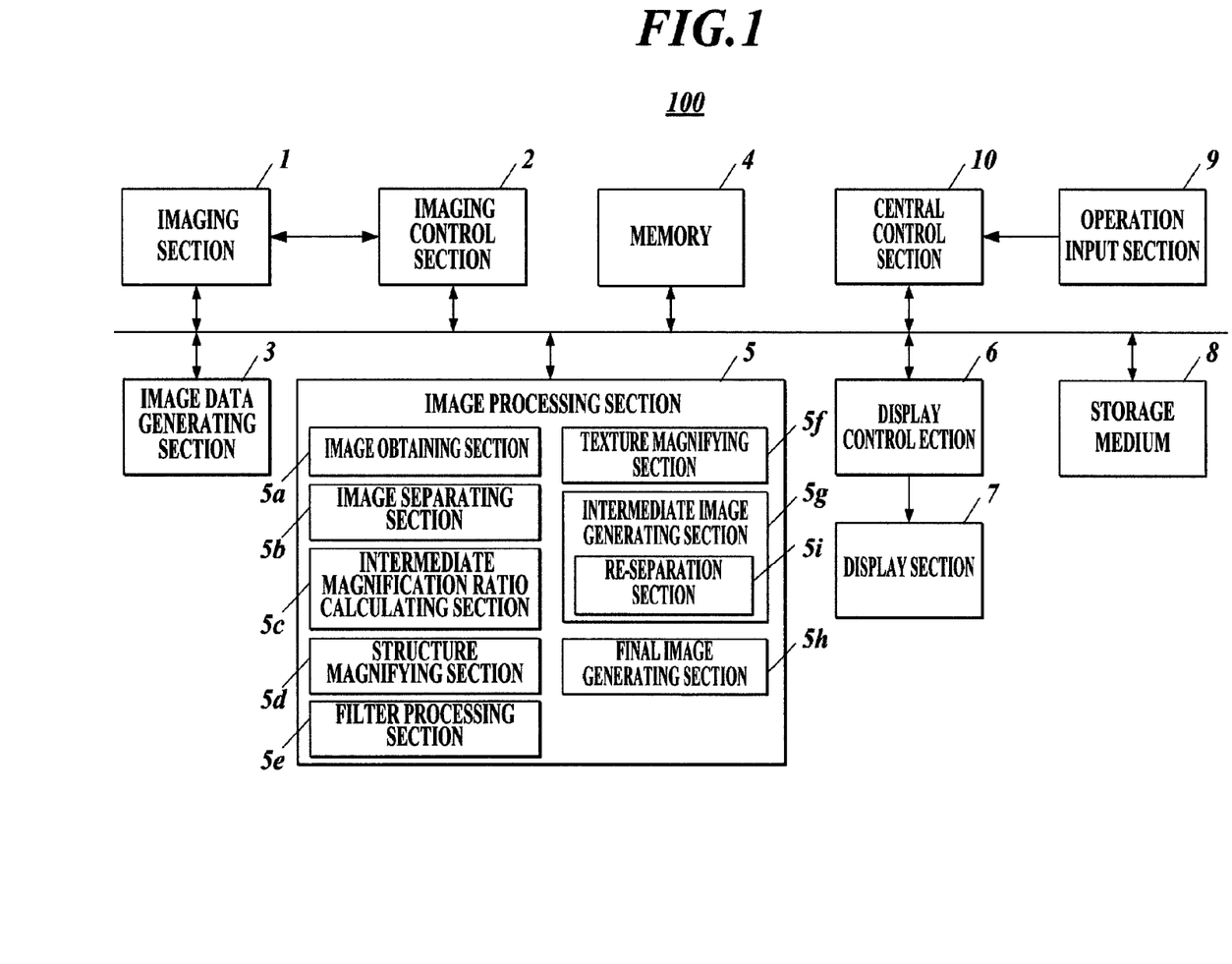
FIG. 1 is a block diagram showing a schematic configuration of an imaging apparatus of an embodiment to which the present invention is applied.

FIG. 1 is a block diagram showing the schematic configuration of an imaging apparatus 100 of an embodiment to which the present invention is applied.

Figure 4A:
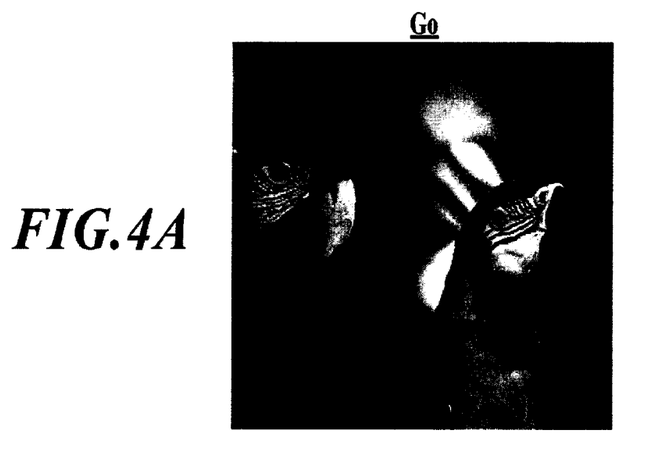
FIGS. 4A, 4B, and 4C are views schematically showing an example of an image for describing the image magnifying processing of FIG. 2.
Figure 4B:
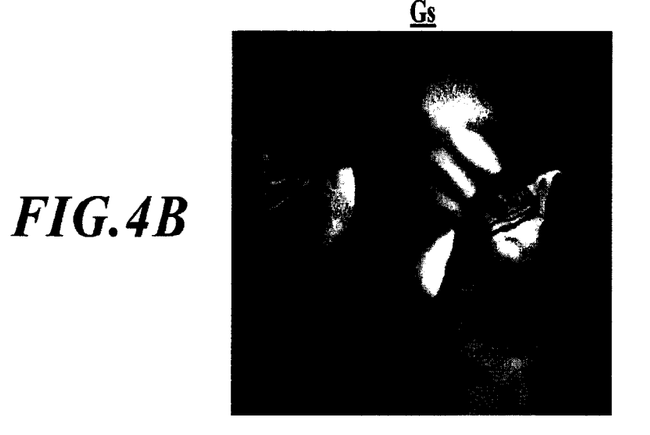
Figure 4C:
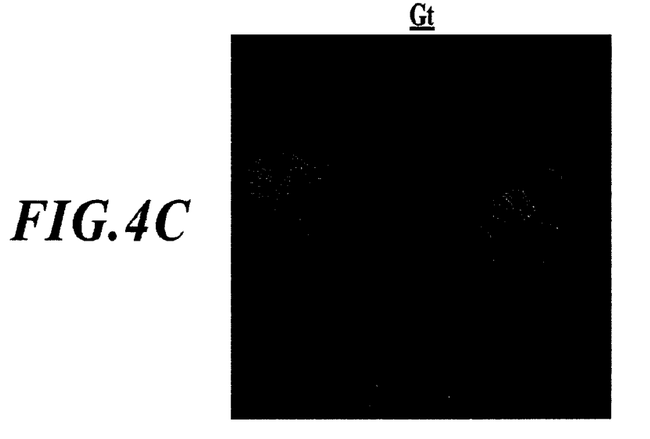

The imaging apparatus 100 of the present embodiment magnifies each of a structure component (e.g. structure component Gs; see FIG. 4B) and a texture component (e.g. texture component Gt; see FIG. 4C), both separated from an original image (e.g. original image Go; see FIG. 4A) by an intermediate magnification ratio, and synthesizes the structure component and the texture component after the magnification to generate an intermediately magnified image. Then, the imaging apparatus 100 magnifies the structure component separated from the intermediately magnified image to generate a finally magnified structure component which has a final magnification ratio to the original image in size. The imaging apparatus 100 magnifies the texture component of the original image to generate a finally magnified texture component which has the final magnification ratio to the original image in size. The imaging apparatus 100 synthesizes the generated finally magnified structure component and the finally magnified texture component to generate a finally magnified image (e.g. finally magnified image Gf; see FIG. 5A).

To put it concretely, as shown in FIG. 1, the imaging apparatus 100 is composed of an imaging section 1, an imaging control section 2, an image data generating section 3, a memory 4, an image processing section 5, a display control section 6, a display section 7, a storage medium 8, an operation input section 9, and a central control section 10.

The imaging section 1 images a subject to generate an image frame. To put it concretely, the imaging section 1 includes a lens section composed of a plurality of lenses such as a zoom lens and a focus lens, an iris diaphragm for adjusting the quantity of the light passing through the lens section, and an electronic imaging section, which is composed of an image sensor such as a charge coupled device (CCD) or a complementary metal-oxide semiconductor (CMOS) and converts an optical image passing through the various lenses of the lens section into a two-dimensional image signal, although their illustration is omitted.

The imaging control section 2 is composed of a timing generator, a driver, and the like, although their illustration is omitted. The imaging control section 2 performs the scan drive of the electronic imaging section with the timing generator and the driver to make the electronic imaging section convert an optical image into a two-dimensional image signal every predetermined period. The imaging control section 2 then reads out image frames from the image area of the electronic imaging section for every one screen to output the read image frames to the image data generating section 3.

Furthermore, the imaging control section 2 performs automatic exposure (AE) processing, automatic focusing (AF) processing, automatic white balancing (AWB), and the like as the adjustment control of imaging conditions.

The image data generating section 3 suitably performs the gain adjustment of each color component of red (R), green (G), and black (B) of a signal of an analog value of image data transferred from the electronic imaging section. After that, the image data generating section 3 performs the sample and hold of the signal with a sample-and-hold circuit (not shown), and converts the held signal into digital data with an analog-to-digital (A/D) converter (not shown). The image data generating section 3 then performs color process processing including pixel interpolation processing and γ correction processing with a color process circuit (not shown), and, after that, generates a luminance signal Y and color-difference signals Cb and Cr (image data in YUV color space) of digital values.

The luminance signal Y and the color-difference signals Cb and Cr output from the color process circuit are transferred to the memory 4, used as a buffer memory, by the direct memory access (DMA) transfer through a not-shown DMA controller.

The memory 4 is, for example, composed of a dynamic random-access memory (DRAM) or the like, and temporarily stores the data processed by the image processing section 5, the central control section 10, and the like.

The image processing section 5 includes an image obtaining section 5a, an image separating section 5b, an intermediate magnification ratio calculating section 5c, a structure magnifying section 5d, a filter processing section 5e, a texture magnifying section 5f, an intermediate image generating section 5g, and a final image generating section 5h.

The image obtaining section 5a, as an obtainment section, obtains an original image (e.g. original image Go) imaged by the imaging section 1 as a processing object image.

To put it concretely, the image obtaining section 5a, for example, obtains any one of image data designated by a user's predetermined operation of the operation input section 9 among at least one of the image data stored in the storage medium 8.

The image separating section 5b separates at least one of a structure component (e.g. structure component Gs) and a texture component (e.g. texture component Gt) from the processing object image (e.g. original image Go). That is, the image separating section 5b separates at least one of a structure component including an edge part indicating the shape and the size of an object in a processing object image and a flat part thereof, and a texture component including a fine pattern (texture: a repetitive luminance pattern expressing the feel of a surface) expressing a fine part produced by a change of the luminance of the object in the processing object image from the processing object image by the Total Variation Method.

To put it concretely, the image separating section 5b, as a first separation section, separates a structure component and a texture component from an original image as a processing object image, obtained by the image obtaining section 5a, by the Total Variation Method. Furthermore, the image separating section 5b, as a second separation section, separates a structure component from an intermediately magnified image generated by the intermediate image generating section 5g as a processing object image by the Total Variation Method.

The illustrated method as a separation method of a structure component and a texture component from a processing object image by the image separating section 5b is only an example, and the separation method is not limited to the above illustrated one.

The intermediate magnification ratio calculating section 5c calculates an intermediate magnification ratio smaller than a final magnification ratio of an original image (e.g. original image Go). That is, the intermediate magnification ratio calculating section 5c calculates at least one intermediate magnification ratio by dividing a magnification ratio (final magnification ratio) of an original image (processing object image) set on the basis of a user's predetermined operation of a selection determination button of the operation input section 9 in an image reproduction mode by a predetermined number. To put it concretely, the intermediate magnification ratio calculating section 5c calculates at least one divisor as an intermediate magnification ratio by reducing a final magnification ratio. At this time, if a plurality of divisors other than "1" (same magnification) is calculated, the intermediate magnification ratio calculating section 5c selects the minimum divisor other than "1" as a first intermediate magnification ratio and selects another divisor other than the minimum divisor as a second intermediate magnification ratio.

For example, if the final magnification ratio is set to "eight times," the intermediate magnification ratio calculating section 5c sets "two times" as the first intermediate magnification ratio from among 1, 2, and 4 of the divisors of "8," and sets "four times" as the second intermediate magnification ratio. Furthermore, for example, if the final magnification ratio is set to "fifty times," the intermediate magnification ratio calculating section 5c sets "two times" as the first intermediate magnification ratio from among 1, 2, 5, 10, and 25 of the divisors of "50," and sets "five times," "ten times," and "twenty-five times" as the second intermediate magnification ratios. Here, it is not always necessary to set all of the divisors (e.g. "five times," "ten times," and "twenty-five times") other than the minimum divisor as the second intermediate magnification ratios. Furthermore, the order of the plurality of second intermediate magnification ratios to be used in processing is, for example, an ascending order, but the order is not limited to the ascending order. The order can arbitrarily be changed to be, for example, a descending order.

The intermediate magnification ratio is not limited to a positive integer, but any number may be used as long as the number is one calculated by dividing the final magnification ratio by the predetermined number. Consequently, a positive decimal and a positive fraction may be used. Furthermore, the divisor of the final magnification ratio is not limited to an integer, but a positive decimal and a positive fraction may be used.

Here, the intermediate magnification ratio calculating section 5c constitutes a calculation section for calculating at least one of intermediate magnification ratios by dividing a final magnification ratio designated by a user's predetermined operation of the operation input section 9 by a predetermined number.

The structure magnifying section 5d magnifies a structure component (e.g. structure component Gs) separated from an original image (e.g. original image Go) by the image separating section 5b to generate an intermediately magnified image which has an intermediate magnification ratio to the original image in size by a predetermined magnification method. If a second intermediate magnification ratio of the original image is set here, the structure magnifying section 5d magnifies a structure component separated from a first intermediately magnified image by a re-separation section 5i (described below) of the intermediate image generating section 5g to generate an intermediately magnified structure component which has the second intermediate magnification ratio to the original image in size by the predetermined magnification method.

Furthermore, the structure magnifying section 5d magnifies a structure component separated from an intermediately magnified image (e.g. first intermediately magnified image or second intermediately magnified image (described below)) by the image separating section 5b to generate the finally magnified structure component which has the final magnification ratio to the original image in size by the predetermined magnification method.

As the magnification method of the structure magnifying section 5d, for example, a method of using the interpolation processing by the bicubic method, which can achieve a change of an image to be a more natural high definition one, can be given.

The filter processing section 5e performs predetermined filtering processing of the structure component magnified by the structure magnifying section 5d.

To put it concretely, the filter processing section 5e first performs sharpening processing to emphasize the image edge (contour) of a structure component magnified by the structure magnifying section 5d by the use of a predetermined sharpening filter (e.g. Laplacian Filter). Next, the filter processing section 5e performs anisotropically diffusing processing to smooth the image edge of the structure component after the sharpening processing with the image edge in the tangent line direction thereof and the image edge in the vertical direction having different weights by means of a predetermined anisotropically diffusing filter (e.g. Total Variation Filter).

Here, if the filter processing section 5e adopts the finally magnified structure component as a processing object, the structure component after anisotropically diffusing processing is set as the finally magnified structure component.

That is, the structure magnifying section 5d and the filter processing section 5e constitute a structure magnifying section to generate a finally magnified structure component by magnifying a structure component of an intermediately magnified image separated by the image separating section 5b to have a final magnification ratio to the original image in size.

The texture magnifying section 5f magnifies a texture component (e.g. texture component Gt) separated from an original image (e.g. original image Go) by the image separating section 5b to generate an intermediately magnified texture component which has an intermediate magnification ratio to the original image in size by a predetermined magnification method. Here, if a second intermediate magnification ratio of the original image is set, the texture magnifying section 5f magnifies a texture component separated from the first intermediately magnified image by the re-separation section 5i (described below) of the intermediate image generating section 5g to generate a second intermediately magnified texture component which has the second intermediate magnification ratio to the original image in size by the predetermined magnification method.

Furthermore, the texture magnifying section 5f, as a texture magnifying section, magnifies a texture component (e.g. texture component Gt) separated from an original image (e.g. original image Go) by the image separating section 5b to generate a finally magnified texture component which has a final magnification ratio to the original image in size by a predetermined magnification method.

As a magnification method by the texture magnifying section 5f, for example, the method of using an interpolation processing by the bicubic method, which can achieve a change of an image to be a more natural high definition one, can be given.

The intermediate image generating section 5g synthesizes a structure component magnified by the structure magnifying section 5d and the texture component magnified by the texture magnifying section 5f to generate an intermediately magnified image.

That is, the intermediate image generating section 5g synthesizes a structure component of an original image subjected to predetermined filtering processing by the filter processing section 5e, and a texture component of the original image magnified by the texture magnifying section 5f to have the intermediate magnification ratio to the original image in size to generate intermediately magnified image.

Here, the structure magnifying section 5d, the texture magnifying section 5f, and the intermediate image generating section 5g constitute an intermediate image generating section for magnifying each of a structure component and a texture component of an original image separated by the image separating section 5b to have an intermediate magnification ratio smaller than a final magnification ratio and synthesizing the structure component and texture component after the magnification to generate an intermediately magnified image.

Furthermore, if a second intermediate magnification ratio of an original image (e.g. original image Go) is set, the intermediate image generating section 5g synthesizes a structure component and a texture component of an original image magnified by the structure magnifying section 5d and the texture magnifying section 5f, respectively, to have a first intermediate magnification ratio relative to the original image in size to generate a first intermediately magnified image. Then, the intermediate image generating section 5g separates the structure component and the texture component from the first intermediately magnified image by the re-separation section 5i. Here, the separation of the structure component and the texture component by the re-separation section 5i is performed by, for example, the Total Variation Method, the operation of the re-separation section 5i is different from that of the image separating section 5b only in the processing objects, and the substantial processing content is almost the same. The illustrated separation method of a structure component and a texture component from a processing object image by the re-separation section 5i is only an example, and the separation method is not limited to the one described above.

Then, the separation of a structure component and a texture component by the re-separation section 5i is performed until all of at least one second intermediate magnification ratio calculated by the intermediate magnification ratio calculating section 5c has been used.

Here, the re-separation section 5i constitutes a re-separation section to separate a structure component and a texture component from an intermediately magnified image (e.g. first intermediately magnified image) generated by the intermediate image generating section 5g when there is at least one second intermediate magnification ratio larger than a first intermediate magnification ratio calculated by the intermediate magnification ratio calculating section 5c.

Furthermore, as for each of the structure component and the texture component of an intermediately magnified image (e.g. first intermediately magnified image) separated by the re-separation section 5i, the intermediate image generating section 5g synthesizes the structure component and the texture component magnified by the structure magnifying section 5d and the texture magnifying section 5f, respectively, to have any one of second intermediate magnification ratios (e.g. a next larger magnification ratio to the first intermediate magnification ratio) calculated by the intermediate magnification ratio calculating section 5c to the original image in size to newly generate a second intermediately magnified image.

Here, the new generation of a second intermediately magnified image by the intermediate image generating section 5g is performed until all of at least one second intermediate magnification ratio calculated by the intermediate magnification ratio calculating section 5c has been used.

Figure 5A:
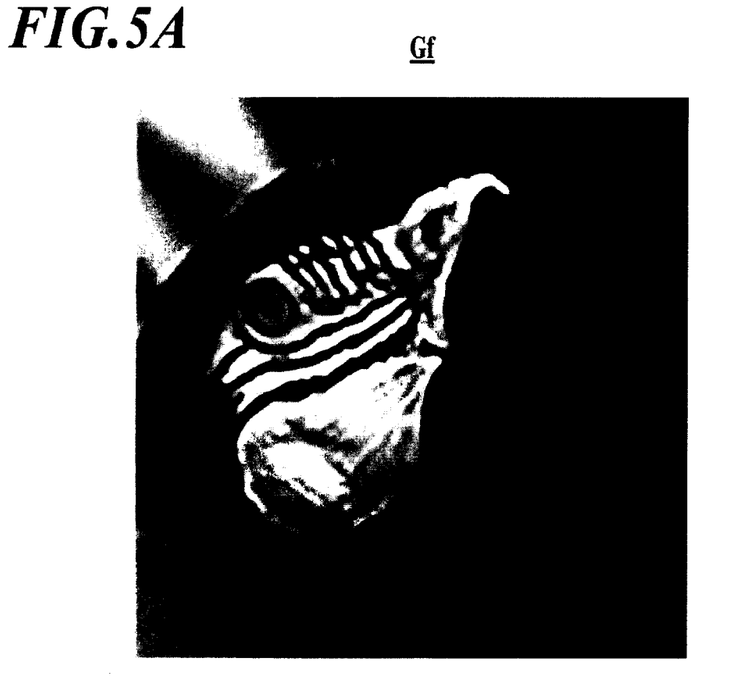
FIGS. 5A and 5B are views schematically showing an example of an image for describing the image magnifying processing of FIG. 2.

The final image generating section 5h synthesizes a finally magnified structure component and a finally magnified texture component to generate a finally magnified image (e.g. finally magnified image Gf; see FIG. 5A).

That is, the final image generating section 5h synthesizes a finally magnified structure component generated by being subjected to predetermined filtering processing by the filter processing section 5e and a finally magnified texture component magnified by the texture magnifying section 5f to have a final magnification ratio to the original image in size to generate a finally magnified image.

Here, the final image generating section 5h constitutes a final image generating section to synthesize a finally magnified structure component generated by the structure magnifying section 5d and the filter processing section 5e and a finally magnified texture component generated by the texture magnifying section 5f to generate a finally magnified image.

The display control section 6 performs the control of reading out displaying image data temporarily stored in the memory 4 and making the display section 7 display the read-out displaying image data.

To put it concretely, the display control section 6 includes a video random access memory (VRAM), a VRAM controller, a digital video encoder, and the like. Then, the digital video encoder periodically reads out a luminance signal Y and color-difference signals Cb and Cr, which have been read-out from the memory 4 and have been stored in the VRAM (not shown) under the control of the central control section 10, from the VRAM through the VRAM controller and generate a video signal on the basis of these data to output the generated video signal to the display section 7.

The display section 7 is, for example, a liquid crystal display apparatus and displays an image and the like, imaged by the electronic imaging section, on a display screen on the basis of a video signal from the display control section 6. To put it concretely, the display section 7 sequentially updates a plurality of image frames generated by the imaging of a subject by the imaging section 1 at a predetermined frame rate while displaying a live view image in a still image imaging mode and a moving image imaging mode. Furthermore, the display section 7 displays an image data instructed to be displayed among a plurality of image data stored in the storage medium 8 on the basis of a user's predetermined operation with the operation input section 9.

The storage medium 8 is composed of, for example, a nonvolatile memory (flash memory) and the like, and stores still image data and moving image data including a plurality of image frames, both image data are for recording and coded into a predetermined compression format by a coding section (not shown) of the image processing section 5.

The operation input section 9 performs predetermined operations of the imaging apparatus 100. To put it concretely, the operation input section 9 is equipped with a shutter button for a photographing instruction of a subject, the selection determination button for a selection instruction of an imaging mode, a function, and the like, and a zoom button for an adjustment instruction of a zoom quantity (all of them are not shown), and the operation input section 9 outputs predetermined operation signals to the central control section 10 according to the operations of these buttons.

Furthermore, the selection determination button of the operation input section 9 inputs a setting instruction of a magnification ratio (final magnification ratio) of an original image (processing object image) displayed on the display section 7 on the basis of a user's predetermined operation in the image reproduction mode. Then, the operation input section 9 outputs a predetermined setting signal to the central control section 10 according to the operation of the selection determination button.

The central control section 10 sets a magnification ratio of a user's desired image according to the input setting signal.

Here, the operation input section 9 and the central control section 10 constitute a designation section to designate a final magnification ratio of a processing object image (original image).

The final magnification ratio is not limited to a positive integer (e.g. "eight times" and "twenty-five times"), but may be a positive decimal and a positive fraction.

The central control section 10 controls each section of the imaging apparatus 100. To put it concretely, the central control section 10 includes a central processing unit (CPU) (not shown) and performs various control operations in accordance with various processing programs (not shown) for the imaging apparatus 100.

Next, image magnifying processing by the imaging apparatus 100 will be described with reference to FIGS. 2 and 3.

Figure 2:
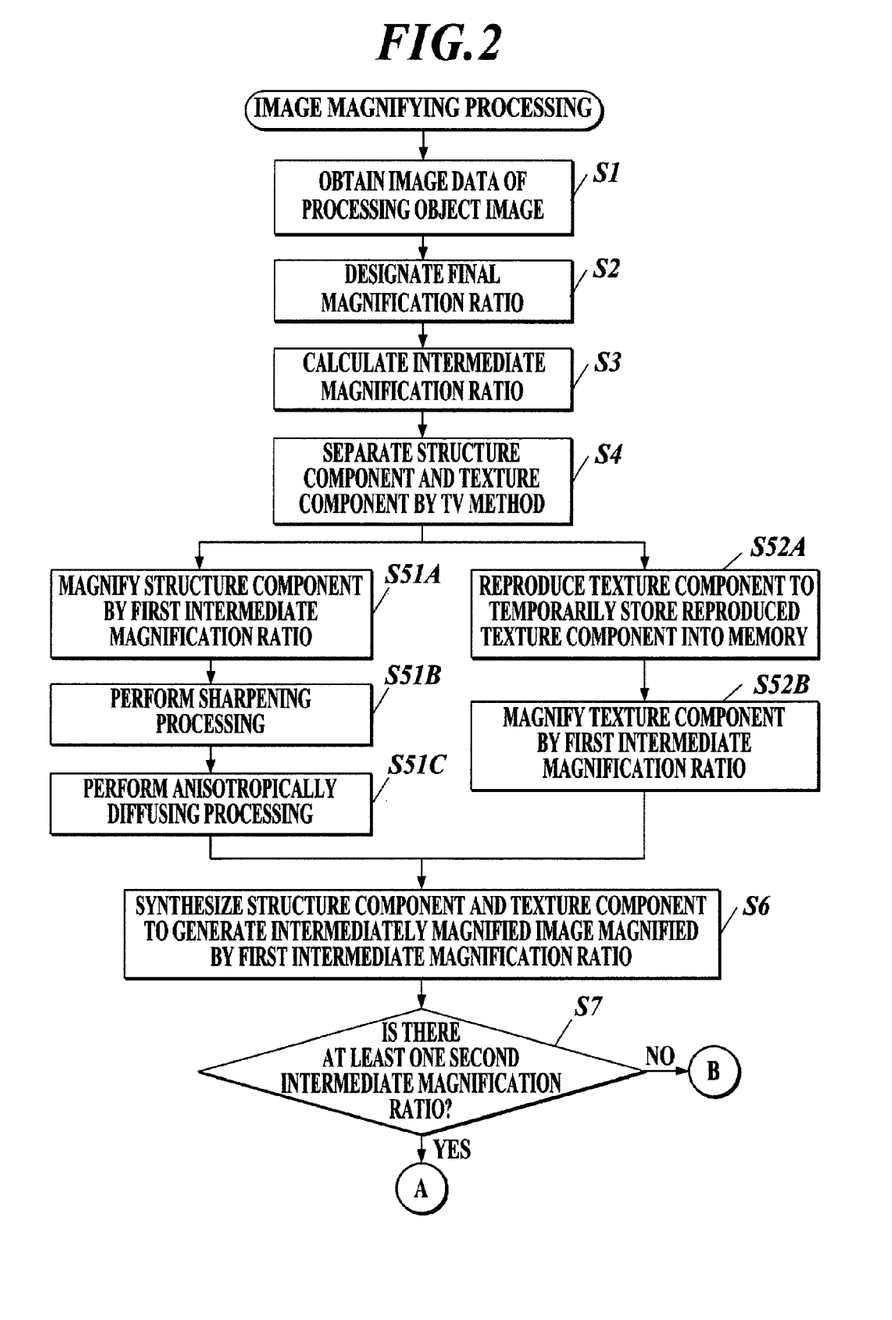
FIG. 2 is a flow chart showing an example of the operation of an image magnifying processing by the imaging apparatus of FIG. 1.
Figure 3:
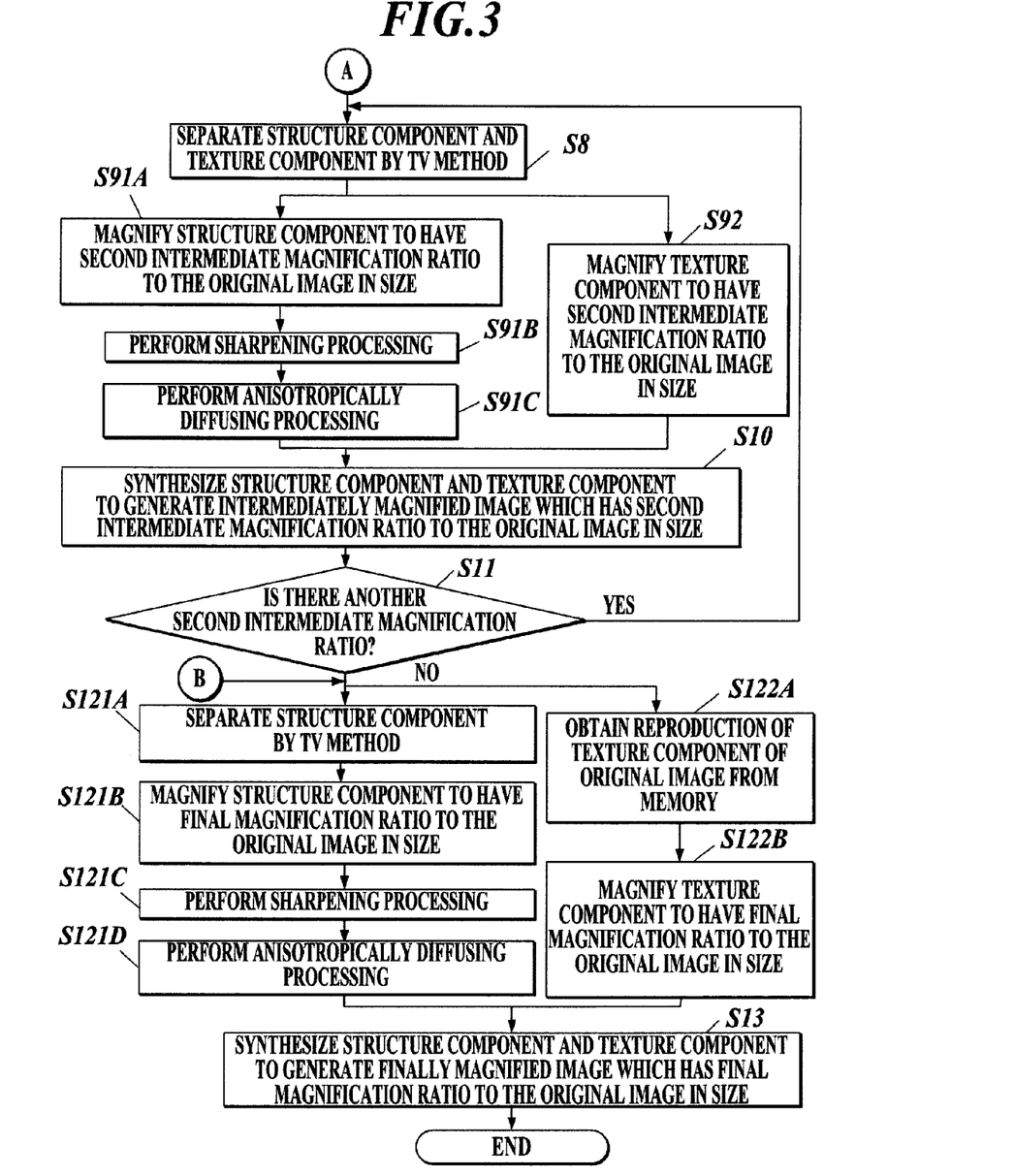
FIG. 3 is a flow chart showing a continuation of the image magnifying processing of FIG. 2.

FIGS. 2 and 3 are flow chart showing an example of the operation of image magnifying processing.

The image magnifying processing is processing to be executed when an image reproduction mode is subjected to a selection instruction among a plurality of imaging modes displayed on a menu screen on the basis of a user's predetermined operation of the selection determination button in the operation input section 9.

As shown in FIG. 2, first, when any one of at least one image data stored in the storage medium 8 is designated on the basis of a user's predetermined operation of the selection determination button in the operation input section 9, the image obtaining section 5a of the image processing section 5 obtains the image data designated by the user as a processing object image (Step S1). Hereby, the display section 7 is in the state of displaying the processing object image (e.g. original image Go).

After that, when a final magnification ratio (e.g. eight times) of the processing object image (e.g. original image Go) displayed in the display section 7 is designated by a user's predetermined operation of the operation input section 9, the operation input section 9 outputs a predetermined setting signal to the central control section 10, and the central control section 10 sets a final magnification ratio of a user's desired image according to the input setting signal (Step S2).

Next, the intermediate magnification ratio calculating section 5c of the image processing section 5 calculates at least one intermediate magnification ratio by dividing the set final magnification ratio of the processing object image by a predetermined number (Step S3). To put it concretely, for example, if the final magnification ratio is set to "eight times," the intermediate magnification ratio calculating section 5c sets "two times" among 1, 2, and 4 of the divisors of "8" as a first intermediate magnification ratio, and sets "four times" as a second intermediate magnification ratio.

Successively, the image separating section 5b of the image processing section 5 separates a structure component (e.g. structure component Gs) and a texture component (e.g. texture component Gt) from an original image (e.g. original image Go) as the processing object image by the Total Variation Method (Step S4).

Each of the separated structure component and the texture component is led to be sequentially processed in parallel or in the separated order by the image processing section 5. In the following description, first, the processing content of the structure component will be described, and after that, the processing content of the texture component will be described.

<Processing of Structure Component>

First, the structure magnifying section 5d of the image processing section 5 magnifies the structure component (e.g. structure component Gs) separated from the original image (e.g. original image Go) to have the first intermediate magnification ratio (e.g. "two times") to the original image in size by the predetermined magnification method (Step S51A).

Next, the filter processing section 5e of the image processing section 5 performs the sharpening processing of emphasizing the image edge (contour) of structure component magnified by the structure magnifying section 5d (Step S51B), and after that, the filter processing section 5e performs anisotropically diffusing processing of smoothing the image edge of the structure component after the sharpening processing with different weights in the tangent line direction of the image edge and in the vertical direction thereof (Step S51C).

<Processing of Texture Component>

The image processing section 5 reproduces the texture component (e.g. texture component Gt) separated from the original image (e.g. original image Go) and temporarily stores the reproduced texture component in the memory 4 (Step S52A). After that, the texture magnifying section 5f magnifies the texture component separated from the original image to have the first intermediate magnification ratio (e.g. "two times") to the original image in size by a predetermined magnification method (Step S52B).

Then, after the completion of the processing of the structure component and the processing of the texture component, the intermediate image generating section 5g of the image processing section 5 synthesizes the structure component after the anisotropically diffusing processing by the filter processing section 5e and the texture component magnified by the texture magnifying section 5f to generate a first intermediately magnified image magnified to have the first intermediate magnification ratio to the original image in size (Step S6).

Next, the image processing section 5 judges whether there is at least one second intermediate magnification ratio calculated by the intermediate magnification ratio calculating section 5c or not (Step S7).

For example, if the final magnification ratio is set to "eight times," and "four times" is set as the second intermediate magnification ratio by the intermediate magnification ratio calculating section 5c, there is one second intermediate magnification ratio. Consequently, it is judged that there is at least one second intermediate magnification ratio at Step S7 (Step S7:YES), and the re-separation section 5i of the intermediate image generating section 5g separates the structure component and the texture component from the first intermediately magnified image by the Total Variation Method (Step S8).

Each of the separated structure component and the texture component is led to be sequentially processed by the image processing section 5 in parallel or the order of being separated. In the following description, first, the processing content of the structure component will be described, and after that, the processing content of the texture component will be described.

<Processing of Structure Component>

The processing of the structure component separated from the first intermediately magnified image to be described in the following is almost the same as the processing (Step S51A-S51C) of the structure component separated from the original image except that the magnification ratios are different from each other.

That is, first, the structure magnifying section 5d of the image processing section 5 magnifies the structure component separated from the first intermediately magnified image to have a second intermediate magnification ratio (e.g. "four times") to the original image in size by the predetermined magnification method (Step S91A). To put it concretely, for example, the structure magnifying section 5d of the image processing section 5 generates the structure component magnified by the second intermediate magnification ratio to be "four times" relative to the original image by magnifying the structure component separated from the first intermediately magnified image to be "two times".

Next, the filter processing section 5e of the image processing section 5 performs the sharpening processing of emphasizing the image edge (contour) of the structure component magnified by the structure magnifying section 5d (Step S91B), and after that, the filter processing section 5e performs anisotropically diffusing processing of smoothing the image edge of the structure component after the sharpening processing with different weights in the tangent line direction of the image edge and in the vertical direction thereof (Step S91C).

<Processing of Texture Component>

Almost similarly to the processing of the texture component separated from the original image (Step S52B), the texture magnifying section 5f of the image processing section 5 magnifies the texture component separated from the first intermediately magnified image to have the second intermediate magnification ratio (e.g. "four times") to the original image in size by the predetermined magnification method (Step S92). To put it concretely, for example, the texture magnifying section 5f of the image processing section 5 generates the texture component magnified to have the second intermediate magnification ratio of "four times" relative to the original image by magnifying the texture component separated from the first intermediately magnified image by "two times."

Then, After the completion of the processing of the structure component and the processing of the texture component, the intermediate image generating section 5g of the image processing section 5 synthesizes the structure component after the anisotropically diffusing processing by the filter processing section 5e and the texture component magnified by the texture magnifying section 5f to generate a second intermediately magnified image magnified to have the second intermediate magnification ratio relative to the original image (Step S10).

Next, the image processing section 5 judges whether there is at least one second intermediate magnification ratio calculated by the intermediate magnification ratio calculating section 5c or not (Step S11).

If it is judged that there is another second intermediate magnification ratio at Step S11 (Step S11:YES), the image processing section 5 shifts the processing to Step S8 and executes the processing on and after that.

The processing on and after Step S8 is repetitively performed until it is judged that there are no other second intermediate magnification ratios at Step S11 (Step S11: NO). Hereby, the image processing section 5 uses all the second intermediate magnification ratios calculated by the intermediate magnification ratio calculating section 5c for the processing, and thereby the image processing section finally generates the second intermediately magnified image magnified to have the second intermediate magnification ratio largest next to the final magnification ratio.

Then, if it is judged that there are no other second intermediate magnification ratio at Step S11 (Step S11:NO), the image processing section 5 individually performs each of the processing of the structure component and the texture component. Furthermore, also if it is judged that there are no second intermediate magnification ratios at Step S7 (Step S7: NO), the image processing section 5 individually performs each of the processing of the structure component and the texture component.

Each of the structure component and the texture component is led to be sequentially processed by the image processing section 5 in parallel or the order of being separated. In the following description, first, the processing content of the structure component will be described, and after that, the processing content of the texture component will be described.

<Processing of Structure Component>

First, the image separating section 5b of the image processing section 5 separates the structure component from the second intermediately magnified image by the Total Variation Method (Step S121A).

Next, almost similarly to the processing (Step S91A) of the structure component separated from the first intermediately magnified image, the structure magnifying section 5d of the image processing section 5 magnifies the structure component separated from the second intermediately magnified image to have the final magnification ratio (e.g. "eight times") relative to the original image in size by the predetermined magnification method (Step S121B). To put it concretely, for example, the structure magnifying section 5d of the image processing section 5 generates the structure component of the final magnification ratio by magnifying the structure component separated from the second intermediately magnified image by "two times" to be "eight times" relative to the original image.

Next, almost similarly to the processing (Step S91B-S91C) of the structure component separated from the first intermediately magnified image, the filter processing section 5e of the image processing section 5 performs the sharpening processing of emphasizing the image edge (contour) of the structure component magnified by the structure magnifying section 5d (Step S121C), and after that, the filter processing section 5e performs anisotropically diffusing processing of smoothing the image edge of the structure component after the sharpening processing with different weights in the tangent line direction of the image edge and in the vertical direction thereof (Step S121D).

Then, the structure component after the anisotropically diffusing processing is set as the finally magnified structure component.

<Processing of Texture Component>

After the image processing section 5 obtains the reproduction of the texture component (e.g. texture component Gt) separated from the original image (e.g. original image Go) from the memory 4 (Step S122A), the texture magnifying section 5f magnifies the texture component separated from the original image to have the final magnification ratio (e.g. "eight times") relative to the original image in size by the predetermined magnification method to generate a finally magnified texture component (Step S122B).

Then, After the completion of the processing of the structure component and the processing of the texture component, the final image generating section 5h of the image processing section 5 synthesizes the finally magnified structure component and the finally magnified texture component to generate a finally magnified image (e.g. finally magnified image Gf; see FIG. 5A) magnified to have the final magnification ratio (e.g. "eight times") relative to the original image in size (Step S13).

Hereby, the image magnifying processing ends.

As described above, the imaging apparatus 100 of the present embodiment separates a structure component (e.g. structure component Gs) and a texture component (e.g. texture component Gt) from an original image (e.g. original image Go) by the Total Variation Method. The imaging apparatus 100 magnifies each component to have an intermediate magnification ratio relative to the original image in size and synthesizes the magnified structure component and the magnified texture component to generate an intermediately magnified image. The imaging apparatus 100 synthesizes a finally magnified structure component generated by magnifying a structure component separated from the intermediately magnified image by the Total Variation Method to have a final magnification ratio relative to the original image in size and a finally magnified texture component generated by magnifying the texture component of the original image to have the final magnification ratio relative to the original image in size to generate a finally magnified image (e.g. finally magnified image Gf; see FIG. 5A). As above, by substantially adding superposed texture components to a structure component, it is possible to generate a finally magnified image with noise being inconspicuous while a fine pattern (texture) is emphasized.

Figure 5B:
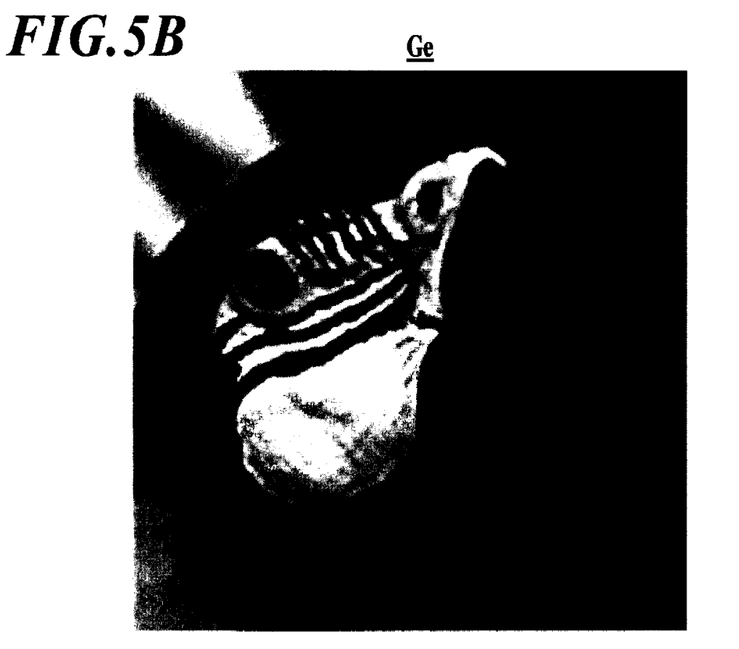

That is, a texture component including a fine pattern (texture) is added to be synthesized at each of the generation step of an intermediately magnified image and a generation step of a finally magnified image, and thereby the fine pattern can be emphasized in each image. Furthermore, by not magnifying a structure component to have a designated final magnification ratio at a time but by stepwise magnifying the structure component, it is possible to suppress the deterioration of the image quality to achieve a change of an image to be a high definition one in comparison with an image magnified by a conventional method (e.g. image Ge; see FIG. 5B). As a result, a finally magnified structure component changed to be a more high-definition one can be generated, and the noise generated in a finally magnified image (e.g. finally magnified image Gf) generated by synthesizing the finally magnified structure component and a finally magnified texture component including noise can be made to be relatively inconspicuous.

Consequently, even if the magnification ratio to an original image is made to be larger, it is possible to emphasize the image edge of a finally magnified image to properly achieve a change of the finally magnified image to a high definition one without making the image edge become dim and deteriorate the image quality of the magnified image owing to the increase of noise unlike an image magnified by the conventional method.

Furthermore, if there is at least one second intermediate magnification ratio larger than a first intermediate magnification ratio, the imaging apparatus 100 of the present embodiment re-separates a structure component and a texture component from an intermediately magnified image by the Total Variation Method, and magnifies each of the structure component and the texture component of the intermediately magnified image to have any one of the second intermediate magnification ratios to the original image in size. Concretely, the intermediate image generating section 5g generates a (fourth) structure component and a (fourth) texture component by magnifying each of the (third) structure component and the (third) texture component separated by the re-separating section 5i to have one second intermediate magnification ratio larger than the intermediate magnification ratio, which is most recently used by the intermediate image generating section 5g, among the at least one second intermediate magnification ratio to the original image in size, and synthesizes the (fourth) structure component and the (fourth) texture component to generate a new (second) intermediately magnified image. Because the structure component and the texture component after the magnification are synthesized to generate a new intermediately magnified image, it is possible to generate the intermediately magnified image a plurality of times by setting a plurality of intermediate magnification ratios even if a designated final magnification ratio becomes larger. Hereby, it is possible to suppress the deterioration of the image quality of a magnified image to change the image to be a high definition one in comparison with the case of magnifying an image to have the final magnification ratio at a time, and a higher definition finally magnified structure component can be generated. As a result, the noise generated in a finally magnified image (e.g. finally magnified image Gf) can be made to be relatively inconspicuous.

The present invention is not limited to the aforesaid embodiment, but various improvements and changes of the design may be performed within the range of the sprit and the scope of the present invention.

For example, the design may be adapted to obtain a structure image by applying a bilateral filter to an original image several times, and to obtain a texture image by subtracting the structure image from the original image. Moreover, the texture image may include color differences besides luminance. Furthermore, although the first intermediate magnification ratio and the second intermediate magnification ratio are set as intermediate magnification ratios, the intermediate magnification ratios are not limited to the first and the second intermediate magnification ratios, but it is only necessary to set at least one intermediate magnification ratio. For example, if the final magnification ratio is set to "four times," only "two times" other than "1" between 1 and 2, which are the divisors of "4," is set as the intermediate magnification ratio.

Furthermore, the configuration of the imaging apparatus 100 illustrated in the aforesaid embodiment is an example, and the configuration of the imaging apparatus 100 is not limited to the example. For example, the imaging apparatus may be an image processing apparatus that is composed in such a way that the imaging of a processing object image is performed with an imaging apparatus other than the imaging apparatus 100, and that the imaging apparatus 100 obtains the image data of a processing object image transferred from the other imaging apparatus to perform the image magnifying processing of the image data.

In addition, although the aforesaid embodiment is configured in such a way that the functions as the obtainment section, the designation section, the first separation section, the intermediate image generating section, the second separation section, the structure magnifying section, the texture magnifying section, and the final image generating section are realized by the driving of the central control section 10, the operation input section 9, the image obtaining section 5a of the image processing section 5, the image separating section 5b, the structure magnifying section 5d, the texture magnifying section 5f, the intermediate image generating section 5g, and the final image generating section 5h, respectively, each of the realization measures of the respective functions are not limited to the above ones, but the configuration of realizing the respective functions by the execution of a predetermined program or the like by the CPU of the central control section 10 may be adopted.

That is, a program including an obtainment processing routine, a designation processing routine, a first separation processing routine, an intermediate image generation processing routine, a second separation processing routine, a structure magnification processing routine, a texture magnification processing routine, and a final image generation processing routine is previously stored in a program memory 4 (not shown). Then, the CPU of the central control section 10 may be functioned as an obtainment section to obtain an image by the obtainment processing routine. Furthermore, the CPU of the central control section 10 may be functioned as a designation section to designate a final magnification ratio of an original image obtained by the obtainment section by the designation processing routine. Furthermore, the CPU of the central control section 10 may be functioned as the first separation section to separate a structure component and a texture component from an original image obtained by the obtainment section by the first separation processing routine. Furthermore, the CPU of the central control section 10 may be functioned by the intermediate image generation processing routine as an intermediate image generating section to magnify each of the structure component and the texture component of an original image separated by the first separation section to have an intermediate magnification ratio smaller than a final magnification ratio and to synthesize the structure component and the texture component after the magnification to generate an intermediately magnified image. Furthermore, the CPU of the central control section 10 may be functioned by the second separation processing routine as a second separation section to separate a structure component from an intermediately magnified image generated by the intermediate image generating section. Furthermore, the CPU of the central control section 10 may be functioned by the structure magnification processing routine as a structure magnifying section to magnify the structure component of an intermediately magnified image separated by the second separation section to have a final magnification ratio to the original image in size to generate a finally magnified structure component. Furthermore, the CPU of the central control section 10 may be functioned by the texture magnification processing routine as a texture magnifying section to magnify the texture component of an original image separated by the first separation section to have a final magnification ratio relative to the original image in size. Furthermore, the CPU of the central control section 10 may be functioned by the structure magnification processing routine as a final image generating section to synthesize the finally magnified structure component generated by the structure magnifying section and the finally magnified texture component generated by the texture magnifying section to generate a finally magnified image.

The entire disclosure of Japanese Patent Application No. 2009-225732 filed on Sep. 30, 2009 including description, claims, drawings, and abstract are incorporated herein by reference in its entirety.

Although various exemplary embodiments have been shown and described, the invention is not limited to the embodiments shown. Therefore, the scope of the invention is intended to be limited solely by the scope of the claims that follow.

What is claimed is:

1. An image processing apparatus, comprising:
an obtainment section to obtain an original image;
a designation section to designate a final magnification ratio of the original image obtained by the obtainment section;
a first separation section to separate a structure component and a texture component from the original image obtained by the obtainment section;
an intermediate image generating section to generate magnify each of the structure component and the texture component separated from the original image by the first separation section by an intermediate magnification ratio smaller than the final magnification ratio, and to synthesize the magnified structure component and the magnified texture component to generate an intermediately magnified image;
a second separation section to separate a structure component from the intermediately magnified image generated by the intermediate image generating section;
a structure magnifying section to magnify the structure component separated from the intermediately magnified image by the second separation section to generate a finally magnified structure component which has the final magnification ratio to the original image in size;
a texture magnifying section to magnify the texture component separated from the original image by the first separation section to generate a finally magnified texture component which has the final magnification ratio to the original image in size; and
a final image generating section to synthesize the finally magnified structure component and the finally magnified texture component to generate a finally magnified image.

2. The image processing apparatus according to claim 1, further comprising a calculation section to calculate at least one intermediate magnification ratio by dividing the final magnification ratio designated by the designation section by a predetermined number,
wherein the intermediate image generating section magnifies each of the structure component and the texture component of the original image by the at least one intermediate magnification ratio calculated by the calculation section.

3. The image processing apparatus according to claim 2, wherein the intermediate image generating section magnifies each of the structure component and the texture component of the original image by a first intermediate magnification ratio calculated by the calculation section and synthesizes the magnified structure component and the magnified texture component to generate a first intermediately magnified image;
wherein the intermediate image generating section further comprises a re-separating section to separate a structure component and a texture component from the first intermediately magnified image when there is at least one second intermediate magnification ratio calculated by the calculation section and larger than the first intermediate magnification ratio;
wherein the intermediate image generating section further magnifies each of the structure component and the texture component separated from the first intermediately magnified image by the re-separation section to have one second intermediate magnification ratio among the at least one second intermediate magnification ratio calculated by the calculation section to the original image in size, and synthesizes the magnified structure component and the magnified texture component to generate a new intermediately magnified image; and
wherein the separation of the structure component and the texture component by the re-separating section and the generation of the new intermediately magnified image by the intermediate image generating section are performed until all of the at least one second intermediate magnification ratio calculated by the calculation section is used.

4. An image processing method using an image processing apparatus, comprising:
obtaining an original image;
designating a final magnification ratio of the obtained original image;

separating a structure component and a texture component from the obtained original image;

magnifying each of the separated structure component and the separated texture component of the original image by an intermediate magnification ratio smaller than the final magnification ratio, and synthesizing the magnified structure component and the magnified texture component to generate an intermediately magnified image;

separating a structure component from the generated intermediately magnified image;

magnifying the separated structure component of the intermediately magnified image by the final magnification ratio to generate a finally magnified structure component which has the final magnification ratio to the original image in size;

magnifying the separated texture component of the original image by the final magnification ratio to generate a finally magnified texture component which has the final magnification ratio to the original image in size; and synthesizing the generated finally magnified structure component and the generated finally magnified texture component to generate a finally magnified image.

5. A non-transitory computer-readable storage medium storing a program enabling a computer of an image processing apparatus to function as elements comprising:

an obtainment section to obtain an original image;

a designation section to designate a final magnification ratio of the original image obtained by the obtainment section;

a first separation section to separate a structure component and a texture component from the original image obtained by the obtainment section;

an intermediate image generating section to magnify each of the structure component and the texture component separated from the original image by the first separation section by an intermediate magnification ratio smaller than the final magnification ratio, and to synthesize the magnified structure component and the magnified texture component to generate an intermediately magnified image;

a second separation section to separate a structure component from the intermediately magnified image generated by the intermediate image generating section;

a structure magnifying section to magnify the structure component from the intermediately magnified image by the second separation section to generate a finally magnified structure component which has the final magnification ratio to the original image in size;

a texture magnifying section to magnify the texture component separated from the original image by the first separation section to generate a finally magnified texture component which has the final magnification ratio to the original image in size; and a final image generating section to synthesize the finally magnified structure component and the finally magnified texture component to generate a finally magnified image.

* * * * *

UNITED STATES PATENT AND TRADEMARK OFFICE
CERTIFICATE OF CORRECTION

PATENT NO. : 8,401,341 B2
APPLICATION NO. : 12/892979
DATED : March 19, 2013
INVENTOR(S) : Miyamoto Page 1 of 1

It is certified that error appears in the above-identified patent and that said Letters Patent is hereby corrected as shown below:

In the Claims

Column 15, line 64 (Claim 1):

After "to" delete "generate"

Signed and Sealed this
Twenty-second Day of October, 2013

Teresa Stanek Rea
*Deputy Director of the United States Patent and Trademark Office*